United States Patent [19]

Jones et al.

[11] Patent Number: 5,803,607
[45] Date of Patent: Sep. 8, 1998

[54] METHOD AND APPARATUS FOR MEASUREMENT OF UNSTEADY GAS TEMPERATURES

[75] Inventors: Julian D C Jones, West Linton; James S Barton, Gorebridge; Stephen R Kidd, Moringside; Kamaljit S Chana, Farnborough, all of Great Britain

[73] Assignee: The Secretary of State for Defence in Her Britannic Majesty's Government of the United Kingdom of Great Britian and Northern Ireland, Hants, United Kingdom

[21] Appl. No.: 682,731

[22] PCT Filed: Jan. 24, 1995

[86] PCT No.: PCT/GB95/00132

§ 371 Date: Jan. 6, 1997

§ 102(e) Date: Jan. 6, 1997

[87] PCT Pub. No.: WO95/20752

PCT Pub. Date: Aug. 3, 1995

[30] Foreign Application Priority Data

Jan. 26, 1994 [GB] United Kingdom ............... 9401459

[51] Int. Cl.[6] .................................................. G01B 9/02
[52] U.S. Cl. ........................................ 374/161; 374/121
[58] Field of Search .............................. 374/121, 123, 374/131, 161; 356/43, 44, 345, 346

[56] References Cited

U.S. PATENT DOCUMENTS

| | | | |
|---|---|---|---|
| 4,714,342 | 12/1987 | Jackson et al. | 356/345 |
| 4,918,492 | 4/1990 | Ferdinand et al. | 356/43 |
| 5,200,796 | 4/1993 | Lequime | 374/161 |
| 5,381,229 | 1/1995 | Murphy et al. | 374/161 |

OTHER PUBLICATIONS

Measurement Science and Technology, vol. 4, No. 3, Mar. 1993, pp. 382–387 (Inci et al.), "High Temperature Miniature Fibre Optic Interferometric Thermal Sensors".

Measurement Science and Technology, vol. 4, No. 11, Nov. 1993 pp. 1249–1256 (Pervez), "multi–bit time division multiplexed optical sensors based on the Farry–Perot principle".

Optical Fiber Communication Conference, 19 Jan–22 1987, Reno (Nevada), Kersey, "Two–Wavelength Interferometric Fiber Temperature Sensor".

Optics Letters, vol. 7, No. 11, November 1982, Washing6ton US, pp. 561–562 (Maurer), Sensitive, High–Speed Thermometry Using Optical Fibers.

38Th Int. Gas Turbine & Aeroengine Congress & Exposition–Paper 93–GT–218, 24 May 1993–27 May 1993, pp. 1–6 (Kidd) "Fibre Optic Interferometric Heat Transfer Sensors For Transient Flow Wind Tunnels".

*Primary Examiner*—G. Bradley Bennett
*Attorney, Agent, or Firm*—Nixon & Vanderhye P.C.

[57] ABSTRACT

Apparatus for the measurement of unsteady gas temperatures comprises (a) a temperature probe having a sensing element. The sensing element has an optical interferometer optically coupled to one end of a first, addressing optical fibre. The interferometer has a first partially reflective surface defined at the end of the addressing fibre and a second partially reflective surface spaced from the first partially reflective surface by an optical path length I. The apparatus further comprises (b) a light source optically coupled to a second end of the addressing fibre, (c) an interrogating optical path optically coupled to the addressing fibre by a beam splitter whereby a portion of an optical phase signal from the sensing element is directed to a first end of the interrogating path and a portion of the input light from the light source is directed to a second end of the interrogating path, (d) first photodetector coupled to the first end of the interrogating path; and (e) data acquisition and processing means connected to the photodetector means, the data acquisition and processing means being adapted to derive the temperature of the sensing element from the phase signal.

28 Claims, 7 Drawing Sheets

METHOD AND APPARATUS FOR MEASUREMENT OF UNSTEADY GAS TEMPERATURES

BACKGROUND OF THE INVENTION

1. Field of the Invention

The present invention relates to sensors and associated apparatus and methods for high bandwidth, unsteady gas temperature measurement, based on interferometry using optical fibres. The invention is particularly concerned with the measurement of gas total temperature measurement in turbomachinery, most particularly in gas turbines and compressors as used, for example, in aeroengines.

2. Discussion of Prior Art

Aeroengine development continues to demand exacting improvements in compressor performance. Military aeroengines require increased thrust-to-weight ratio and decreased cost of ownership while maintaining adequate levels of stable operating range and efficiency. Improving efficiency is the primary aim of civil engine development. These requirements are responsible for generic trends in modern compressor design. Fewer rotor stages tend to be used, which increases the aerodynamic stage loading. Blade rows tend to be spaced closer together which, coupled with the increased aerodynamic loading, increases the influence that each row exerts on neighbouring rows. There is also a tendency for the aspect ratio of the blades to be decreased which increases the complexity of the boundary layer flows on the blades, and on the end walls. The consequence of these trends is that the unsteady flow field within the compressor becomes more significant and needs to be taken into account during the design and development of future compressors.

In response to these trends, there is a growth in the attention being paid to unsteady blade row interaction in turbomachinery. However, because of the problems associated with taking unsteady aerodynamic measurements in high speed turbomachinery, there are few measurements in engine-relevant compressors and there is consequently a poor empirical understanding of the fundamental flow processes involved. Nevertheless, concerted effort since the mid-1980's has overcome many of the problems associated with taking wide bandwidth pressure measurements in high speed compressors and such sensors have been employed in engine-relevant machines. Unfortunately, the situation is less satisfactory when unsteady temperature measurements are considered. Both unsteady pressure and temperature measurements are required if the compressor efficiency and entropy flux are to be measured accurately. Further, it is recognised that the measurement systems used to derive steady state blade row performance do not respond properly to the highly pulsatile filed behind rotor rows. Therefore there is a need for pressure, and particularly temperature, measurement systems capable of resolving the fluctuating flow field so that more accurate steady-state measurements can be derived.

SUMMARY OF THE INVENTION

The invention thus relates to measurement apparatus and methods, including a measurement probe based on a fibre optics sensor, for use in measuring rapidly varying temperatures in such applications. The present disclosure includes the results of a demonstration of an embodiment of the probe in a continuous flow compressor test rig. Similar techniques may also be applied to the measurement of pressure at high bandwidth.

It is an object of the invention to provide an optical fibre based sensor allowing the measurement of unsteady temperature fluctuations in high speed compressors. Unsteady pressure measurements in such a compressor have revealed periodic and random flow effects. A corresponding measurement of unsteady temperature was sought in the same compressor, operating under the same conditions. For this purpose it was required that the optical fibre sensor have:

(i) a wide frequency bandwidth of up to 60 kHz to resolve the main flow features associated with blade passing frequencies of up to 12 kHz;

(ii) small physical size (diameter 6 mm) to allow insertion of the probe between closely spaced compressor blade rows; and (iii) robustness to withstand the harsh physical environment (i.e. high-transonic Mach number flows laden with oil mist).

A gas temperature resolution of less that 1 K is desirable, with a sensor operating range up to 600 K.

Whilst the above mentioned performance parameters are desirable for typical turbomachinery applications of the invention, the invention is not restricted to apparatus or methods fulfilling these requirements. In particular, embodiments of the invention providing bandwidths less than 60 kHz may be useful in other applications while still providing significant advances over known unsteady temperature sensing techniques.

A variety of temperature sensors are known for unsteady measurements in turbomachinery, though none have a bandwidth as high as 60 kHz. For example, thermocouple response is limited to about 1 kHz; constant current hot-wire sensors are cross-sensitive to gas velocity fluctuations; thin-wire resistance thermometers are less sensitive to velocity but require compensation as a function of flow speed and show ageing effects in use. Another technique is the aspirating probe with a reported bandwidth of about 20 kHz. This probe consists of a pair of hot wires operating at different overheat ratios upstream of a choked orifice. While this configuration is more robust than an isolated hot wire (and is capable of providing pressure measurements as well), the wires are still prone to ageing and the calibration procedure required is complex.

In accordance with a first aspect of the invention there is provided apparatus for the measurement of unsteady gas temperatures characterised in having (a) a temperature probe having a sensing element comprising optical interferometer means optically coupled to a first end of a first, addressing optical fibre, said interferometer means comprising a first partially reflective surface defined at said first end of said addressing fibre and a second partially reflective surface spaced from said first partially reflective surface; (b) a light source optically coupled to a second end of said addressing fibre; (c) an interrogating optical path optically coupled to said addressing fibre by beam splitting means whereby a portion of an optical phase signal from said sensing element is directed to a first end of said interrogating path and a portion of the input light from said light source is directed to a second end of said interrogating path; (d) first photodetector means coupled to said first end of said interrogating path; and (e) data acquisition and processing means connected to said first photodetector means, said data acquisition and processing means being adapted to derive the temperature of said sensing element from said phase signal.

Preferably the interferometer means comprises a thin optical film deposited on the end face of said addressing fibre at the first end thereof, providing a first partially reflective surface at the interface between said film and said end face and a second partially reflective surface at the outer face of said film remote from said fibre end face. The thin optical film preferably has a thickness of up to 5 microns. The use of thin films tends to give the apparatus a better signal to noise ratio because the thin film has a higher thermo optic coefficient. Also, preferably the optical film comprises zinc selenide or titanium dioxide.

In accordance with a second aspect of the invention there is provided a method of measuring unsteady gas temperatures characterised by a (a) locating a temperature probe in the required position, said temperature probe having a sensing element comprising optical interferometer means optically coupled to a first end of a first, addressing optical fibre, said interferometer means comprising a first partially reflective surface defined at said first end of said addressing fibre and a second partially reflective surface spaced from said first partially reflective surface; (b) illuminating said sensing element with light from a light source optically coupled to a second end of said addressing fibre; (c) interrogating said sensing element by means of an interrogating optical path optically coupled to said addressing fibre by beam splitting means whereby a portion of an optical signal from said sensing element is directed to a first end of said interrogating path and a portion of the input light from said light source is directed to a second end of said interrogating path; (d) monitoring the optical signal from said sensing element by means of first photodetector means coupled to said first end of said interrogating path; and (e) processing said optical signal to derive the temperature of said sensing element by means of data acquisition and processing means connected to said first photodetector means.

BRIEF DESCRIPTION OF THE DRAWINGS

Embodiments of the invention will now be described by way of example only and with reference to the accompanying drawings, in which.

DETAILED DISCUSSION OF PREFERRED EMBODIMENTS

Figure 1:
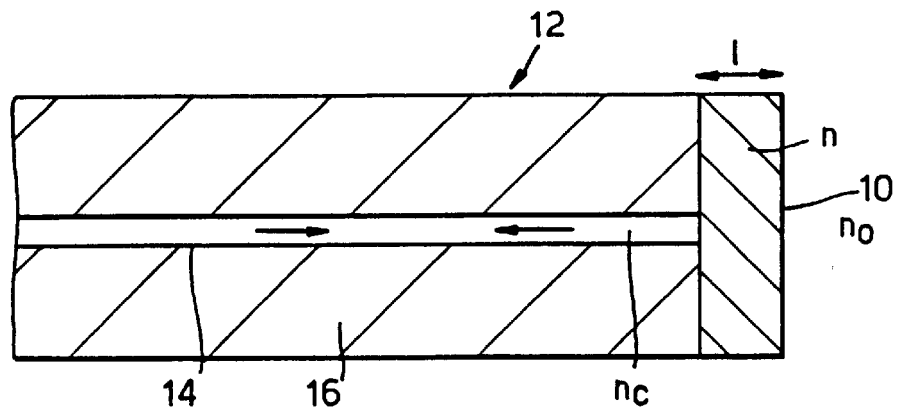
FIG. 1 is a schematic, sectional side view of an embodiment of a sensor in accordance with one aspect of the invention, comprising a thin film sensing element deposited on the end face of an optical fibre (not to scale)

Referring now to the drawings, FIG. 1 shows a first embodiment of a sensor in accordance with the invention, including a sensing element comprising a thin optical film 10 deposited on the end face of an optical fibre 12. The fibre 12 comprises a core 14 surrounded by cladding 16. Laser light launched into the input end of the fibre core 14 is partially reflected by both sides of the film; i.e. a first partial reflection occurs at the interface between the fibre 12 and the film 10 and a second partial reflection occurs at the outer face of the film 10 remote from the end of the fibre 12. The two reflected beams differ in phase by an amount proportional to the optical thickness of the film 10. Interference between the two beams results in a total reflected light intensity that is a periodic function of the optical phase difference between the beams. This phase difference is a linear function of the mean temperature of the film, since the film thickness and refractive index depend linearly on temperature, as is discussed in greater detail below. The reflected signal can therefore be used as a measure of the film temperature. As shown, the film thickness=1, film refractive index=n; and $n_c$ and $n_o$ are the refractive indices of the fibre core and the medium in which the fibre is immersed, respectively. In this example, the optical film 10 employed is formed from zinc selenide (ZnSe), which has a relatively high refractive index and a strong temperature coefficient. Other suitable materials might be employed, such as titanium dioxide ($TiO_2$) which has a refractive index somewhat higher than zinc selenide but a weaker temperature coefficient.

Figure 2:
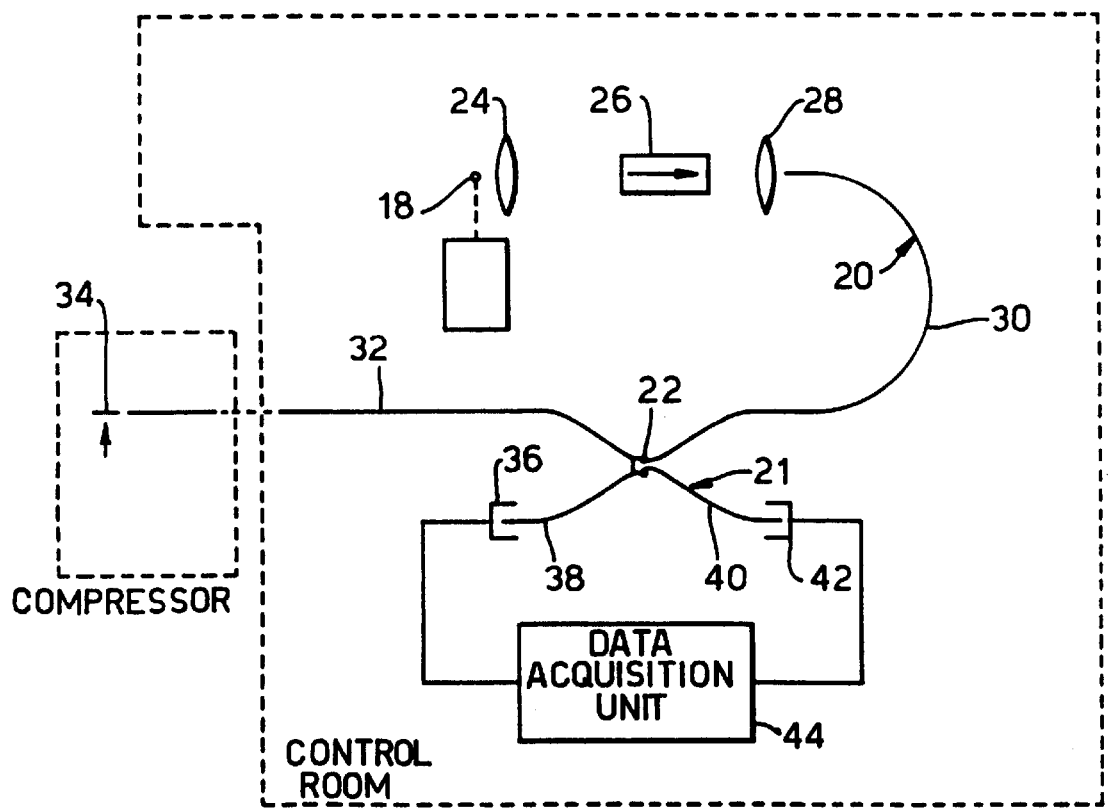
FIG. 2 is a schematic diagram illustrating an embodiment of a temperature measurement system in accordance with the invention, incorporating the sensor of FIG. 1.

The basic optical arrangement of a temperature measurement system incorporating the sensor of FIG. 1 is shown in FIG. 2. The arrangement includes a first, addressing optical fibre 20 and a second, interrogating optical fibre 21, coupled together by a directional coupler 22. Laser diode light is launched from a laser diode 18 into a first arm 30 of the addressing fibre 20 via a first, collimating, lens 24, an optical isolator 26 and a second, focusing, lens 28 (as is well known in the art). The directional coupler 22 splits the incoming light between a second arm 32 of the addressing fibre 20 (corresponding to the fibre 12 of FIG. 1), leading to the measurement probe 34 incorporating a sensor as shown in FIG. 1, and a first arm 38 of the interrogating fibre 21, leading to an intensity reference detector 36, respectively. The intensity reference detector 36 allows the output from the laser diode 18 to be monitored for comparison with the signal from the probe 34 itself.

The signal reflected from the sensor of the probe 34 returns to the coupler 22, where it is split between the first arm 30 of the addressing fibre 20, leading back to the isolation optics 26 (which prevent the light of the reflected signal from reaching the laser diode 18), and a second arm 40 of the interrogating fibre 21, leading to a signal detector 42. Output signals from the intensity reference detector 36 and the signal detector 42 are passed to data acquisition and processing means 44 for processing to provide the required temperature measurements.

Unlike conventional sensors, the fibre optic probe 34 has no electrical connections to the measurement area, thus eliminating electrical interference. Connecting fibre lengths of 200 m are feasible, allowing the launch and detection optics and signal processing to be situated remote from the extreme noise and vibration of an operating compressor rig.

The fibre sensor possesses several features implying its potential for high bandwidth temperature measurement. The optical power required to interrogate the sensor is too small to produce a significant heating effect; thus, cross-sensitivity to velocity is negligible. The film thickness is only a few $\mu$m, such that the thermal mass is low, leading to small thermal time constants. Interferometry is capable of resolving very small changes in optical path length, thus ensuring high temperature sensitivity. The dielectric nature of the sensor avoids several noise sources, thus allowing the intrinsically high temperature resolution of the technique to be exploited.

The theoretical basis underlying the operation of fibre optic interferometric temperature sensors of the type with which the present invention is concerned will now be discussed in greater detail. The following nomenclature will be used:

C=stagnation point velocity gradient
D=diameter
I=optical intensity
N=number of rotor revolutions
a,b,c=constants in optical transfer function
h=heat transfer coefficient
k=thermal spatial frequency
l=sensor length or thickness
n=sensing film refractive index
t=time
u=mean flow velocity
x=position
$\alpha$=thermal diffusivity
$\phi$=optical phase
$\kappa$=thermal conductivity
$\lambda$=optical wavelength
$\nu$=kinematic viscosity
$\omega$=optical angular frequency
$A_o$=wave amplitude
$P_r$=Prandtl number
$P_{(t)}$=ensemble averaged signal
$P'_{(t)}$=random unsteadiness
$n_c$=fibre core refractive index
$n_o$=gas refractive index
$T_m$=mean temperature of sensing element
$T_g$=gas total temperature $\phi_o$=phase constant
$\kappa_f$=fluid thermal conductivity The sensor is a thin film interferometer used in reflection, deposited on the face of a single mode optical fibre. The optical phase difference between the front and back surface reflections is $$\lambda = 4 \times nl/2 \quad (1)$$

where n is the refractive index of the film l the film thickness and $\lambda$ is the illumination wavelength. A mean temperature change $\Delta T_m$ of the film therefore results in a phase change $$\Delta\phi = 4\pi(l/\lambda)[(dn/dt+(n/l)(dl/dt)] \Delta T_m \quad (2)$$

Where dn/dT represents the thermo-optic coefficient of the film, and dl/dT is its thermal expansivity. If the film's absorption is negligible, the optical intensity reflected at normal incidence takes the form $$I(\phi) = I_o[(a-b+c\cos\phi)/(a+b+c\cos\phi)] \quad (3)$$

where a, b, c are defined in terms of the refractive indices:

$$a = (n_c^2 + n^2)(n^2 + n_o^2)$$
$$b = 4n_c n^2 n_o$$
$$c = (n_c^2 - n^2)(n^2 - n_o^2) \quad (4)$$

in which $n_c$ and $n_o$ are the refractive indices of the optical fibre core and of the medium in contact with the film. Thus the temperature dependence of phase $\phi$ results in a temperature-dependent optical intensity at the signal photodetector, which follows the periodic function of equation (3). The response to a temperature change $T_m$ small enough to give rise to a phase change $\Delta\phi \ll 1$ radian will be approximately linear, with a sensitivity depending on the slope of the consine function at the operating point. For a given laser wavelength and ambient temperature, the operating point is determined by the film thickness l, which can be chosen to avoid operation near the turning points of the cosine where the sensitivity approaches zero.

The optical coating employed was zinc selenide. This material has a relatively large thermo-optic coefficient dn/dT and is suitable for deposition in a thin film by vacuum evaporation, as is discussed below. The laser wavelength was approximately 830 nm, at which n was approximately 2.6 and dn/dT approximately $1.0 \times 10^{-4}$, with low optical absorption. For fused silica and air respectively, $n_c=1.46$ and $n_o=1.00$. Using equation (2) and noting that the thermal expansion term is small compared with the thermo-optic coefficient, we find that a mean sensor temperature change of approximately 1700 K corresponds to an optical phase change of $2\pi$. Therefore in the application considered the sensor is always operating in the small signal regime.

The thermal response of the fibre end face exposed to a gas flow (FIG. 1) can be considered in the simplest case as a one-dimensional problem with axial heat conduction into the sensor fibre. If the gas total temperature is time-varying, $T_g(t)$, a thermal disturbance will propagate through the film giving rise to a time-varying mean temperature $T_m(t)$ averaged along the sensor length, which can be measured according to equation (2). The frequency response to thermal oscillations can be calculated from the analytic solution for heat conduction into a semi-infinite rod exposed at its end to a harmonically oscillating ambient temperature. If the gas total temperature varies with unit amplitude as $T_g(t)=\cos\omega t$, the temperature at a distance x into the film is given by $$T(x,t) = A_o \, e^{-loc} \cos(et - loc - \phi_o) \qquad (5)$$

where $$A_o = [1 + 2k/H + 2k^2/H^2]^{-1/2} \qquad (6)$$

$$k = (\omega/2\alpha)^{-1/2} \text{ and } H = h/\kappa$$

in which $\alpha$ and $\kappa$ are the thermal diffusivity and thermal conductivity of the thin film, h is the heat transfer coefficient at the sensor surface, and $\phi_o$ is a frequency-dependent phase constant. Integration of T(x,t) through the film thickness l gives a mean temperature oscillation at frequency $\omega$, amplitude $A_m$ given by $$A_m(\omega) = (A_o/2kl)\,[2(1+e^{-2kl}) - 4e^{-k1} \cos kl]^{1/2} \qquad (7)$$

The expected sensor response to an oscillating gas temperature can be calculated, provided the heat transfer coefficient h from the gas to the sensor is known. This can be estimated by assuming that the sensor is located at the stagnation point of the oncoming flow, which is a good approximation as the fibre core is small compared to its diameter. The heat transfer coefficient at the stagnation point of a body with axisymmetric geometry can be written as $$h = \kappa_f 0.762 \, Pr^{0.4} (C/\nu)^{1/2} \qquad (8)$$

where $\kappa_f$ is the thermal conductivity, Pr the Prandtl number, $\nu$ the kinematic viscosity of the fluid and C is a stagnation point velocity gradient. For a flat-nosed body of diameter D in a mean flow velocity u for a Mach number below 1, White estimates that $$C = 1.35 \, u/D \qquad (9)$$

Equations (8) and (9) can be used to calculate a heat transfer coefficient to the end face of a cylindrical fibre in specified mean flow conditions, and the response of the sensor is then found from equation (7).

Figure 3:
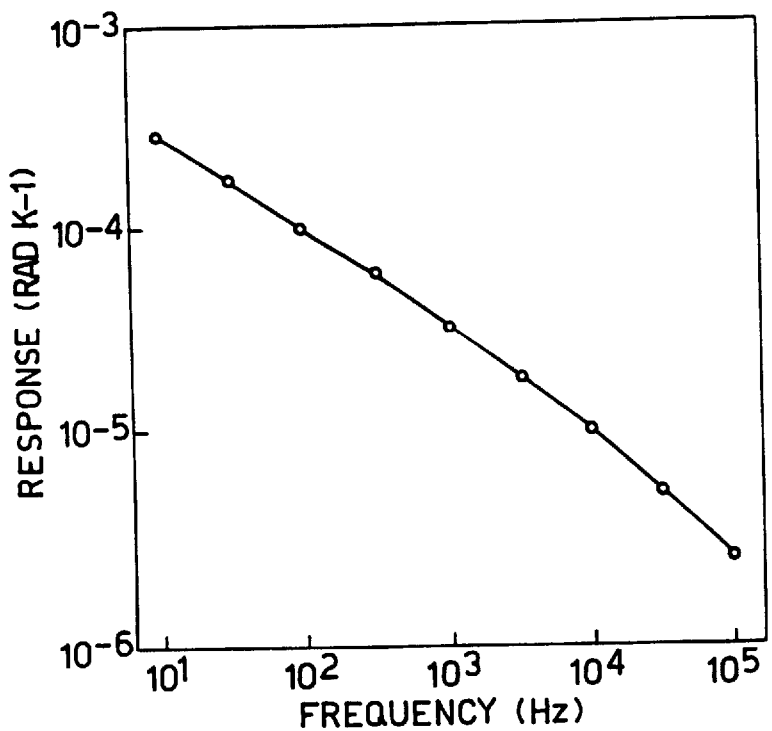
FIG. 3 shows the calculated frequency response of a 2.4 $\mu$m zinc selenide film fibre sensor embodying the invention to a unit amplitude oscillation in air temperature.

The calculated frequency response to a unit amplitude thermal oscillation is shown in FIG. 3 for a 2.4 $\mu$m length sensor. This response can be compared with a shot noise of 1 $\mu$radian/√Hz for optical power levels in practical applications (this noise source being the fundamental limit associated with the random Poisson statistics of the photon flux from which an intensity measurement is made). A 1 $\mu$radian/√Hz noise level is an achievable noise level in the present signal detection system.

Figure 4:
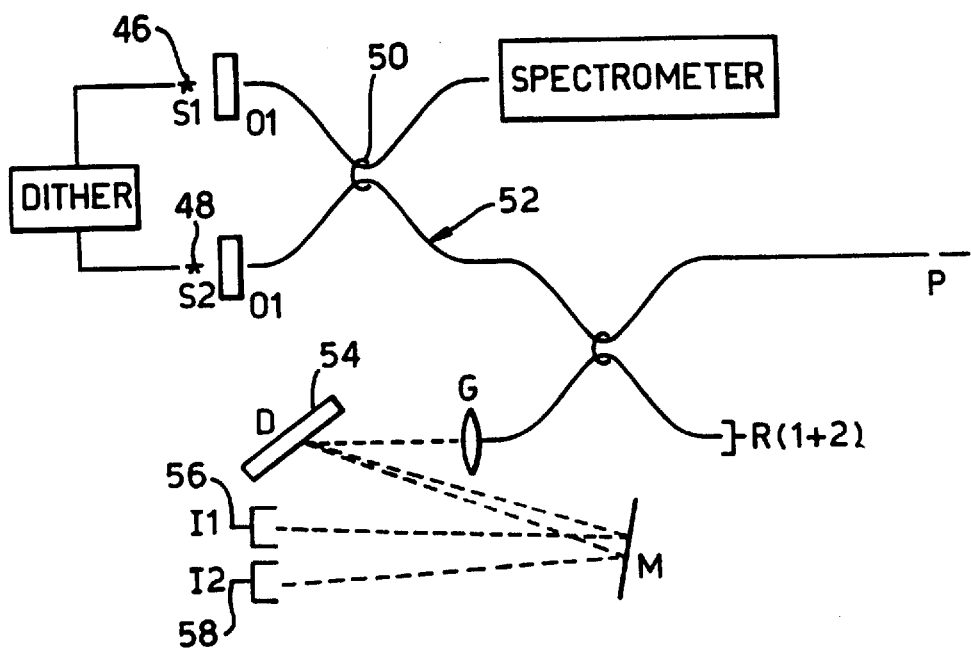
FIG. 4 is a schematic diagram illustrating a modification of the measurement system of FIG. 2 for two wavelength operation of the thin film sensor.

The transfer function in equation (3) is periodic, and its slope, the small-signal sensitivity to phase fluctuations, is similarly periodic. The output signal in single wavelength operation (as in the system illustrated in FIG. 2) would be dependent on the operating point. FIG. 4 shows a modified system in which the output is made independent of operating point by illuminating the interferometer with light from two separate sources 46 and 48 having different wavelengths $\lambda_1$ and $\lambda_2$ chosen to give a phase shift of $\pi/2$ between the resulting transfer functions, so that two signals in phase quadrature are recorded. Light from the two separate laser diodes 46, 48 is combined by a directional coupler 50 before launch into the addressing fibre 52, and the $\lambda_1$ and $\lambda_2$ outputs $I_1$ and $I_2$ are separated spatially by a diffraction grating 54 to two photodetectors 56 and 58.

As an alternative to spatial separation, temporal demodulation may be employed, requiring a single photodetector and amplitude modulation of the two laser sources at different frequencies. Electronic demodulation then yields the return signal at each wavelength. The modulating frequencies must be chose to avoid: (i) cross-talk between the demodulated signals, and (ii) compromising the bandwidth of the overall sensor system.

The sensor temperature change $\Delta T$ is given by the amplitude $(\Delta I_1^2 + \Delta I_3^2)^{1/2}$ which can be computed in software from data acquired from the sensor.

In practice, the phase difference between the $\lambda_1$ and $\lambda_2$ outputs is not exactly $\pi/2$. However, the optical phase and hence $\Delta T$ remain analytic functions of $\Delta I_1$ and $\Delta I_2$. Furthermore, $\Delta T$ may be obtained more precisely if more than two wavelengths are used to illuminate the sensor, so as to provide three or more outputs separated in phase, $\Delta I_1 \ldots \Delta I_n$; $\Delta T$ is then an analytic function of $\Delta I_1 \ldots \Delta I_n$. The phase difference between the respective signals is preferably as close as possible to $\pi/2$ but different values other than 0 or $\pi$ (or multiples thereof) can be employed.

In order to form the sensing element 10 of the sensor of FIG. 1, a ZnSe film is deposited on the cleaved end of the optical fibre 12 by a vacuum vapour deposition technique. This may be carried out, for example, in a fully automated Balzers 550 box coater, in which a molybdenum boat containing high purity (99.99%) ZnSe powder is resistively heated to approximately 900° C. Base pressures of approximately $2\times10^{-6}$ Torr are maintained during evaporation, which is controlled at a deposition rate of 0.5 nm s$^{-1}$. Prior to coating, the cleaved fibre ends are heat soaked by a radiant heater inside the coating unit, to improve coating adhesion and the optical quality of the deposited film.

During evaporation, film thickness is monitored by quartz crystal monitor. Film thicknesses of up to 2.4 $\mu$m have been successfully deposited. Fused silica substrates (approximately 25 nm in diameter) were coated simultaneously as a coating witness, to enable measurement of the refractive index and thickness of the coating by spectrophotometric analysis.

Figure 5:
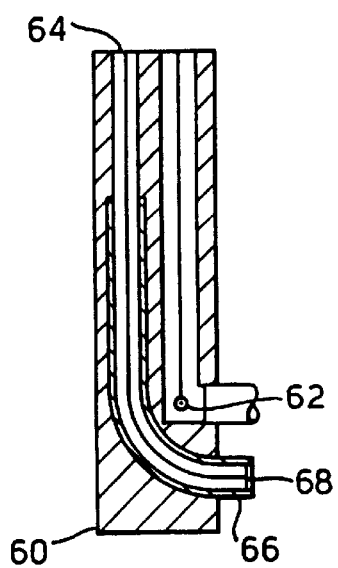
FIG. 5 illustrates a schematic arrangement of an optical fibre right-angle probe in accordance with the invention for use in a test compressor.

The probe for use in the compressor measurements is shown in FIG. 5. The primary requirement of the probe is to provide a rugged mounting for the optical sensor and protection for the fibre optic feedout. The probe body 60 may be adapted from a conventional pneumatic wedge probe fitted with an adjacent shielded thermocouple sensor 62. As such, the configuration is typical of that used routinely in high speed compressor testing. The design of such existing probes may be modified so as to be more suited to wide bandwidth temperature sensors.

The principal problem of the probe design relates to supporting the optical fibre 64 through a 90° turn having a bend radius of about 3 mm in such a way as to secure the end of the sensing optical fibre 64. This may be accomplished by the fibre 64 being supported in a preformed bend in a capillary tube 66 of either glass or metal. A schematic representation of a metal capillary tube-based probe is shown in FIG. 5.

The metal capillary tube-based probe as shown may be constructed as follows: (i) a 5 m length of single mode optical fibre is cleaved at one end; (ii) this end is vacuum coated with a 2.4 $\mu$m thick ZnSe film 68; (iii) a length of metal capillary tube 66 is tempered and a bend of radius 3 mm and length 90° formed; (iv) the capillary tube is trimmed to length to provide a supporting stem of 40 mm and 3 mm length projecting forward; (v) the fibre 64 is drawn through the capillary tube 66 and positioned with the ZnSe film 68 retracted from the flush end of the tube 66 by 20 $\mu$m; (vi) the tube 66 is lightly crimped to clamp the fibre 64 in position; and (vii) the capillary tube 66 is secured inside the stainless steel wedge probe 60 with epoxy adhesive.

For the purposes of aerodynamic testing, a method of generating thermal oscillations at kHz frequencies is required in a test experiment. Some previously reported techniques for generating such thermal oscillations are measurement of the spectrum of thermal fluctuations in a heated turbulent jet and both d.c. and a.c. electrical heating of a wire in an airstream. In the present case, vortex shedding from a heated bluff body was employed, specifically a metal wire carrying direct current and exposed transversely to an air flow. Vortices are shed form the wire at a frequency determined by the flow velocity, generating thermal fluctuation in the wake where warm air and ambient air are mixing at the vortex shedding frequency. This arrangement will also reveal any cross-sensitivity to air velocity, as a velocity fluctuation will still be present at the vortex shedding frequency when the heating current is removed.

The vortex shedding wire was situated 20 nm downstream of the exit of a small open jet wind tunnel. The working section at the outlet was 80 mm square, with a flow velocity range from 5 to 12 ms$^{-1}$ and a measured turbulence intensity of 0.4%. The sensor was positioned approximately 1 mm behind the shedding wire facing upstream with the fibre axis horizontal, so that the mean flow was incident normally on the fibre end face. To monitor the vortices, a conventional hot wire anemometer probe was mounted with its sensing wire coplanar with and at the same height as the sensor end face, approximately 5 mm to one side. Both the fibre and the hot wire probe could be translated together vertically relative to the shedding wire.

The shedding wire wa 0.15 mm diameter nichrome alloy, and for the flow speeds available, the frequencies range from 4 to 13 kHz without applied heating. If the shedding wire is heated above ambient temperature, the Reynolds number of the air close to the wire is decreased, and the vortex shedding frequency is reduced for a flow regime similar to that used here.

Figure 6:
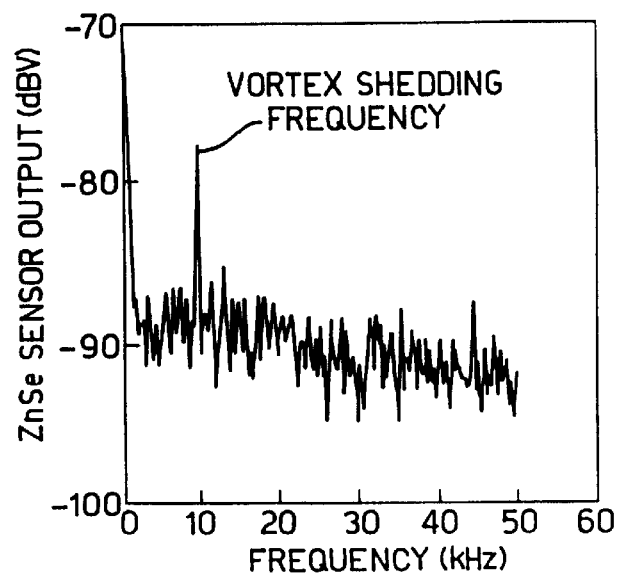
FIG. 6 shows the spectrum of the fibre sensor signal with heating current applied to a vortex shedding wire used in experimental evaluation of sensors in accordance with the invention, with a vortex shedding frequency of 9.6 kHz.

At an air velocity of 10.5 ms$^{-1}$ (Re=104), the vortex shedding frequency was 11.3 kHz with no heating current applied. With 9 W d.c. heating power, the vortex frequency decreased to 9.6 kHz. The output signal was monitored by a spectrum analyser with a linewidth setting of 125 Hz and the results are shown in FIG. 6. A clear spectral peak 10 dB above the noise floor appears at the shedding frequency with heating applied. There was no signal at 11.3 kHz when the heating was removed, returning the shedding wire to ambient temperature, which implies that the thin film sensor has no significant cross-sensitivity to air velocity fluctuations, and is responding to air temperature fluctuations only.

Trials were carried out to expose the temperature sensor to the flow field behind the first stage rotor of a highly loaded 5-stage core compressor. The measurements were taken at several span-wise stations while the machine was operating close to peak efficiency on the design speed characteristic. Typical aerodynamic parameters for the first stage at this condition are given in Table 1 below. Unsteady pressure measurements were also taken. This was the first time unsteady temperature measurements had been attempted in this machine.

TABLE 1

Typical flow parameters behind first compressor stage

| Parameter | Value |
|---|---|
| Flow speed (ms-1) | 225 |
| Mean total temperature (K.) | 339.5 |
| Mean total pressure (kPa) | 112 |

During both pressure and temperature measurements, the data were recorded in two modes: as continuously sampled data, and as multiple data recorded phase-locked to a once-per-revolution trigger pulse. The latter were subsequently processed to reveal the ensemble-averaged temperature variations and the random unsteadiness found in the data. In both modes, the signals were sampled at 500 kHz.

The discontinuous phase-locked data were processed on-line to determine the following parameters.

a) Ensemble averaged signal, i.e.

$$P_{(t)} = \frac{1}{N} \sum_{n=1}^{N} P_{(n,t)}$$

b) Random unsteadiness, i.e.

$$P_{(t)}^1 = \sqrt{\frac{1}{N} \sum_{n=1}^{N} (P_{(n,t)} - P_{(t)})^2}$$

Where P(n,t) is an instantaneous AC coupled signal; N is the number of consecutive rotor revolutions during which phase-locked data capture was carried out in response to a once-per-revolution pulse; and t is the temporal duration of each of the segmented data records (typically 512 or 2048 samples, depending on the recorder module capacity).

Such processing is an established technique which accentuates the periodic unsteadiness correlated with the rotor. As the data are captured in response to a once-per-revolution signal, the rotor is in the same position each time the recording cycle is initiated and differences in the flow field associated with individual rotor passages are retained.

Figure 7A:
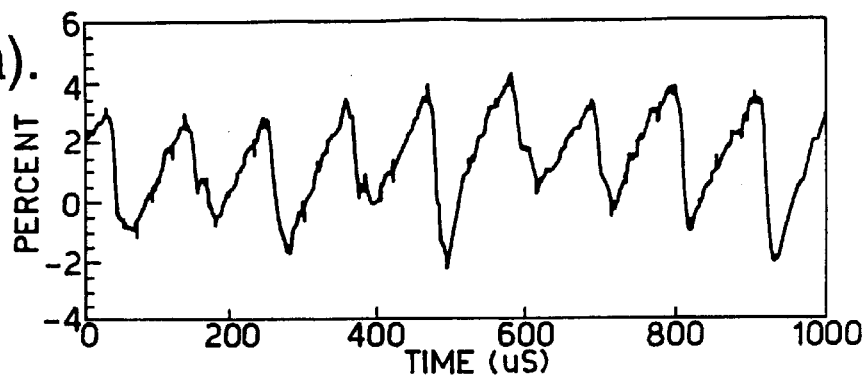
FIG. 7 shows (a) the phase-locked average output signal from a fibre temperature sensor in accordance with the invention close to the hub behind the first stage rotor in compressor trials; and (b) the random unsteadiness of the temperature signal.
Figure 7B:
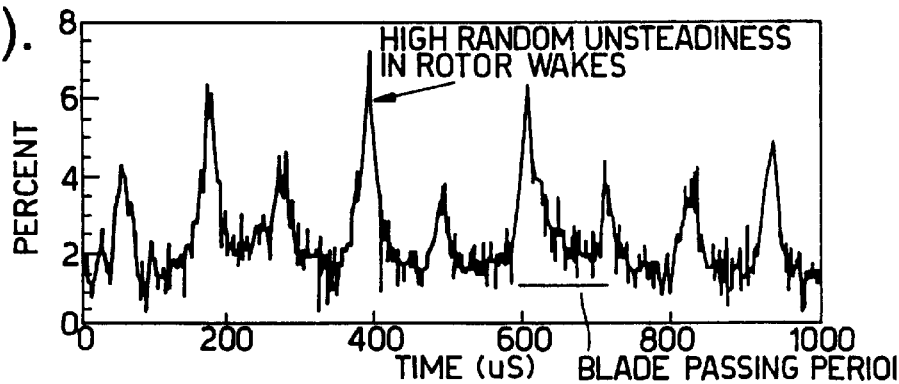
Figure 8A:
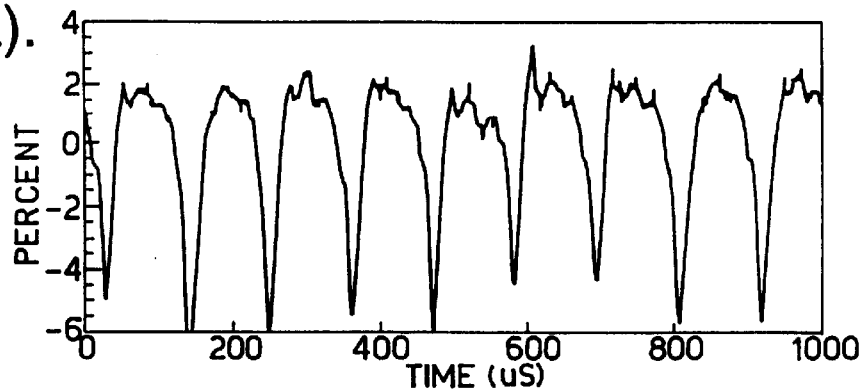
FIG. 8 shows (a) a phase-locked average pressure transducer signal taken under similar run conditions to those in FIG. 7; and (b) the random unsteadiness of the pressure signal.
Figure 8B:
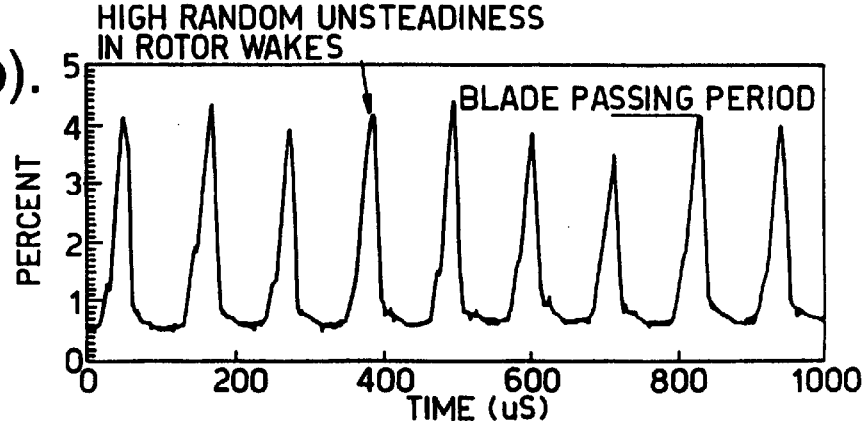

Ensemble-averaged stagnation temperature measurements taken close to the hub (at 10% span) are shown in FIG. 7(*a*). These can be compared with corresponding stagnation pressure measurements, FIG. 8(*a*), taken at the same span-wise position, although during a different run. Also shown are the corresponding random temperature and pressure unsteadiness (FIGS. 7(*b*) and 8(*b*)). There is significant qualitative agreement between both temperature and pressure data, particularly regarding the increased random unsteadiness associated with the blade wakes.

Figure 9:
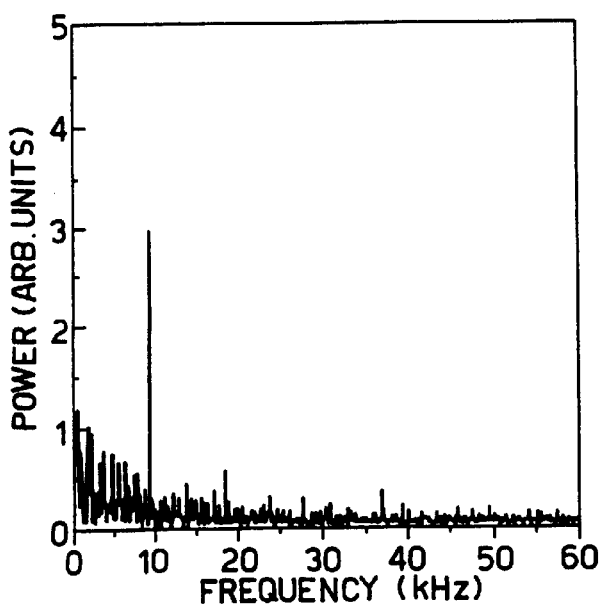
FIG. 9 shows the power spectrum of the fibre sensor signal while located at 10% of span.

The power spectrum of a section of continuously sampled data computed via its Fourier transform is shown in FIG. 9. The dominant component of the spectrum is at the blade passing frequency of 9.2 kHz. However, components at two, three and four times the blade passing frequency are clearly observed above the noise floor, indicating a lower limit on the sensor bandwidth of approximately 36 kHz. Further signal processing reveals response components up to the eighth harmonic, indicating a potential bandwidth up to 74 kHz.

Data were recorded for about one hour's total exposure to the flow, until the signal was lost. The probe was later examined, showing that part of the ZnSe coating had been damaged, presumably by particulates or oil droplets in the flow.

The compressor trials described above were undertaken to demonstrate the feasibility of using an optical fibre sensor in a realistic aerodynamic test facility, rather than as a detailed investigation of the unsteady temperature field in the compressor. Calibration of the data obtained in these trials was not a critical issue, and was performed by comparing the unsteady temperature compressor data with the heated vortex shedding data. The 9.6. kHz vortex shedding signal was close to the blade passing frequency of 9.2 kHz in the radial traverse, therefore the frequency dependence of the sensor's response does not affect the comparison. The sensing film was 2.4 $\mu$m of ZnSe in both cases. The heating power of 9W applied to the vortex shedding wire, if dissipated by convection, would result in a mean air temperature rise in the wake of approximately 10 K, or an amplitude of 5 K in mixing ambient and heated air. The ZnSe film optical response to this amplitude of gas temperature oscillation was determined in the vortex shedding experiment. Thus the sensor response observed in the compressor can be scaled to gas temperature amplitude, assuming the same gas-to-sensor heat transfer coefficient in the two experiments. The data show clear structures at the blade passing frequency, but there is also structure at frequencies above blade passing frequency. Significant components at twice and three times the blade passing frequency were observed.

The sensor coating was damaged after about one hour's exposure to the flow in the compressor. However, the ZnSe coating in this trial sensor was unprotected, and technology exists to apply suitable protective coatings that are sufficiently thin to prevent an adverse effect on the high frequency thermal response. This new optical technique therefore provides the basis for high bandwidth unsteady temperature measurement in continuous flow.

Fibre optic sensors based on interferometry have potential for other applications in aerodynamics test facilities. For example, it has been shown previously that fibre Fabry Perot interferometers are suitable for the measurement of heat flux in transient flow wind tunnels. Furthermore, other transduction principles, such as the strain optic effect in special optical coatings, or miniature air-spaced interferometers, may be applicable for high bandwidth pressure measurement.

The above described embodiment of the invention provides an all-optical temperature sensor that has demonstrated a response to air temperature fluctuations, estimated to be 5 K amplitude, at approximately 10 kHz in a low speed vortex shedding experiment. The sensor is not sensitive to velocity fluctuations. The optical sensor has been incorporated into a probe and run in a test compressor in mean flows of Mach 0.7 No electrical connection is required between the sensor and the associated signal processing means, which may be located remotely. Signals well above noise were obtained in ensemble averaged data showing a strong component at the 9.2 kHz blade passing frequency estimated to range from 1 to 6 K temperature amplitude in a radial traverse from hub to tip.

A second embodiment of a fibre optic interderometric sensor will now be described, with reference to FIGS. 10 to 15.

Figure 10:
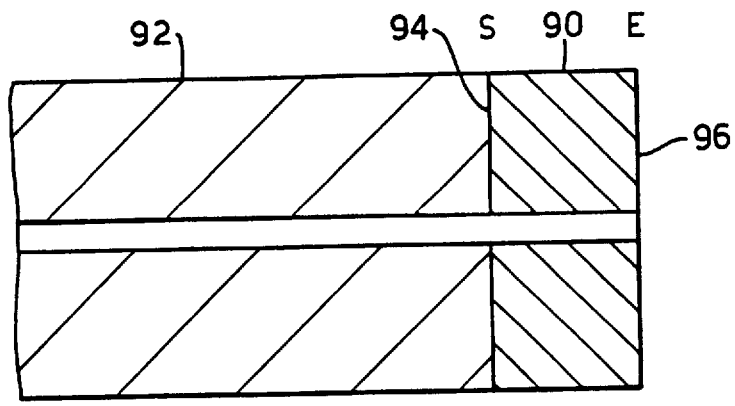
FIG. 10 is a schematic, sectional side view of a second embodiment of a sensor in accordance with the invention.

In the first embodiment of the invention, a Fabry-Perot type interferometer was formed by an optical coating on the end face of the fibre, with the thickness of the coating providing the optical path length between the partially reflective faces of the coating. In the second embodiment, as shown in FIG. 10, the optical path of the interferometer is provided by a short length of fibre 90 spliced to the end of the addressing fibre 92, with a partially reflective coating 94 interposed between the adjacent ends of the addressing fibre 92 and the short sensing fibre 90. A second partially reflective coating may also be applied to the opposite end face 96 of the sensing fibre remote from the splice. A spliced fibre interferometer of this type has previously been used as a heat flux sensor, in which case it is desirable that the sensing fibre be sufficiently long (about 1–2 mm) to prevent heat loss from the spliced end of the sensing fibre. Where a sensor of this type is to be employed as a temperature sensor, rather than as a heat flux sensor, it is desirable that the path length of the interferometer be made relatively shorter so that the sensor body reaches thermal equilibrium within a relatively short time span. The first embodiment, using an optical coating as the interferometer body, provides the shortest practical path length. However, a spliced fibre sensor can also be formed with a sensing fibre which is sufficiently short to provide a useful temperature sensor.

Spliced fibre sensors in accordance with this second embodiment can be made by fusion splicing two fused silica single mode fibres, one of which has a coating of, for example, titanium dioxide on its end face to act as an internal mirror when the splice is formed. One fibre forms the sensing element; the other, longer fibre is the downlead (addressing fibre) connecting to the rest of the optical system. The coatings may be deposited by electron beam evaporation in vacuum, with thicknesses in the range 40 to 80 nm for optimum reflectivity and strength of splice. After fusion splicing, the fibre is mounted on a translation stage and cleaved at the required distance from the splice. In the present example, the outer mirror of the interferometer was formed by the cleaved end face 96 of the sensing element 90. If a higher reflectivity were required it would be possible to coat the outer face 96. With care, sensor lengths less than the fibre cladding diameter (125 $\mu$m) were achievable, the shortest being 14 $\mu$m, with several tens of microns as typical lengths. Previously fabricated FFP sensors for use as calorimeter (heat flux) gauges rather than fast response thermometers, had sensor lengths in the range 200 $\mu$m to 2 mm.

Figure 13:
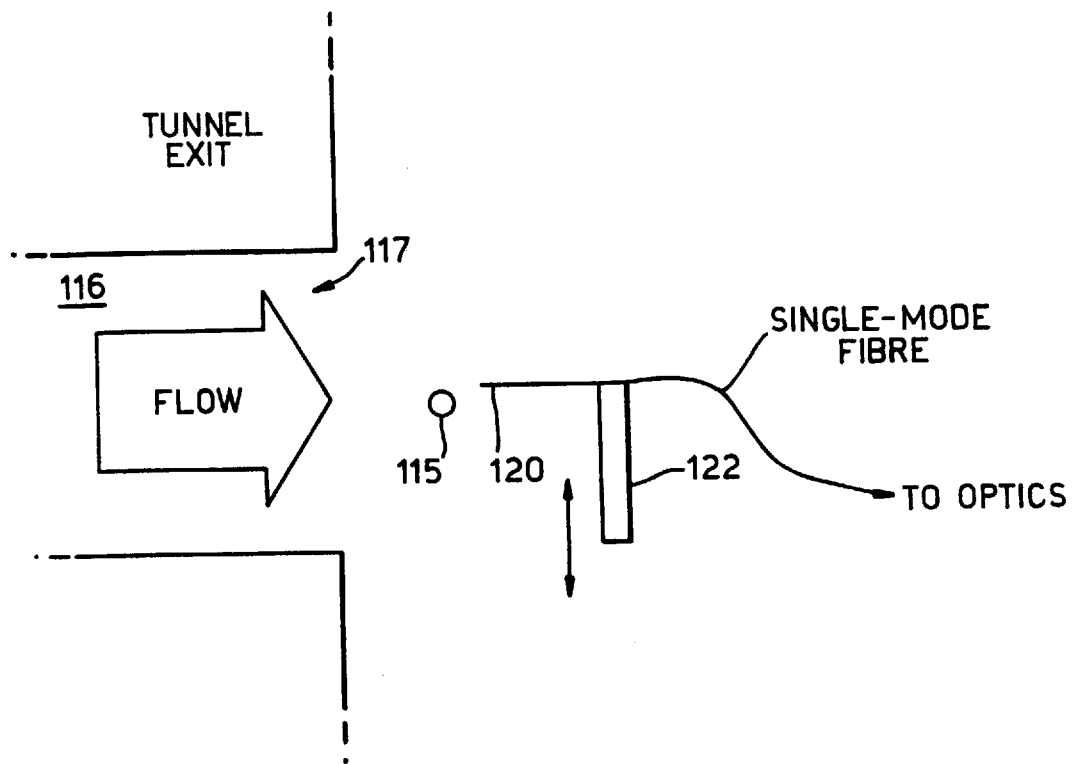
FIG. 13 is a schematic diagram illustrating an experimental arrangement of the sensor of FIG. 10 deployed in the wake of a heated wire to detect temperature oscillations at the vortex shedding frequency.

The optical arrangement is shown in FIG. 13 and is similar to that employed in the first embodiment. The source 100 is a laser diode (Sharp LTO24 with $\lambda$=780 nm, 20 mW optical power) with launch optics 102 including collimating optics and isolation optics in the form of a Faraday isolator, as in the first embodiment. Light from the laser diode 100 is launched via a microscope objective into one arm 104 of a fibre directional coupler 106 with a 50/50 split ratio. The sensor 107 is located at the end of coupler arm 108, and the signal detected by photodetector 109 at the end of arm 110, with a reference detector 112 at the end of arm 114. The fibre ends are index matched to the detectors to minimise reflections.

A single laser wavelength was employed in the present example, in which the objective was to demonstrate the sensor's ability to detect gas temperature oscillations in the frequency domain. As described below, the temperature oscillating was applied at a known narrow band of frequencies so that its presence could be revealed by examining the spectrum of the sensor's output signal. Temperature calibration was not required in this case; it was sufficient to ensure that the sensor was not operating at a turning point on its transfer function (equation (2)), so that small temperature oscillations gave a finite output signal. The response was checked by applying a hot air stream (approximately 200° C.) to the sensor.

This embodiment was also tested in a vortex shedding test rig in a manner similar to the first embodiment. The test rig, described in detail below, was the same as that used in the first embodiment.

The vortex shedding wire 115 was again situated at the exit of a small open jet wind tunnel 116 (FIG. 13). The tunnel body was constructed from polystyrene with a rectangular cross-section and a 10:1 area contraction. Air was supplied by a 40 W centrifugal blower (not shown) at the tunnel inlet. The working section at the tunnel outlet 117 was 80 mm square, with a flow velocity range from 5 to 12 ms$^{-1}$ and a measured turbulence intensity of 0.4%. The vortex shedding wire 115 was 20 mm downstream of the tunnel exit 117 with its axis horizontal, exposed to the flow over the central 70 mm of the 105 mm wire length.

The fibre sensor 120 was positioned approximately 1 mm behind the shedding wire facing upstream with the fibre axis horizontal, so that the mean flow was incident normally on the fibre end face, as shown in FIG. 13. The fibre was attached parallel to a stiff wire support mounted on a translation stage 122 with the final 2 mm of fibre projecting unsupported into the air flow. To monitor the presence of the vortices, a conventional hot wire anemometer probe (DISA type 55, 5 $\mu$m wire diameter) (not shown) was mounted with its sensing wire coplanar with and at the same height as the sensor end face, about 5 mm to one side. Both the fibre sensor 120 and the hot wire probe could be translated together vertically relative to the shedding wire 115.

The shedding 115 wire was 0.37 mm diameter nichrome alloy. The expected vortex shedding frequency f from a circular cylinder diameter d in a flow velocity u i $$f = 0.198 \left[1 - (19.7/Re)\right] u/d \tag{10}$$

where Re is the Reynolds number of the flow with respect to the cylinder. Vortex shedding occurs provided Re is greater than 40, and for the flow speeds available, the frequencies for d=0.37 mm range from 2.2 to 6.0 kHz without heating applied to the shedding wire. If the shedding wire is heated above ambient temperature, the Reynolds number of the air close to the wire is decreased, and the vortex shedding frequency is reduced, as previously noted above. However, the reduction in frequency is not large provided Re is greater than or equal to about 100, a condition met in these experiments.

Figure 14A:
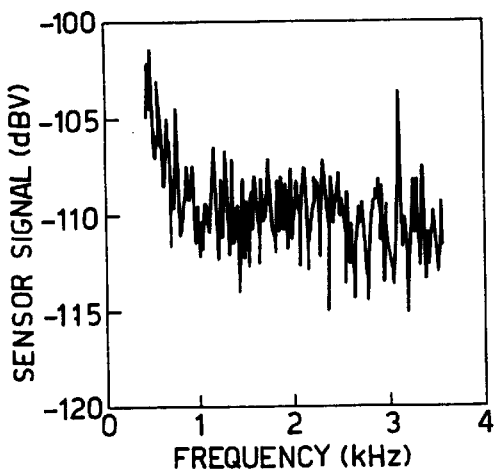
FIG. 14 shows the spectrum of the sensor signal (a) with and (b) without heating current applied to the vortex shedding wire in the arrangement of FIG. 13, with vortex shedding frequencies of (a) 3.10 kHz, (b) 3.46 kHz.
Figure 14B:
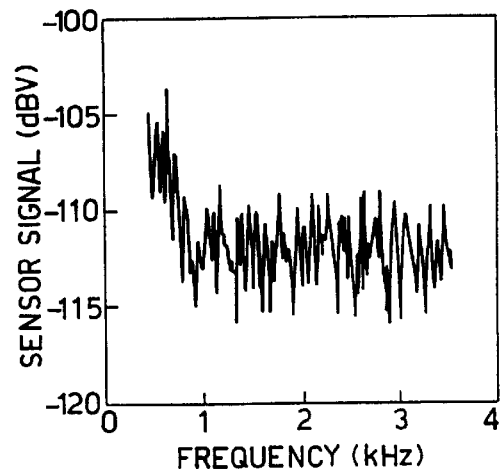
Figure 15A:
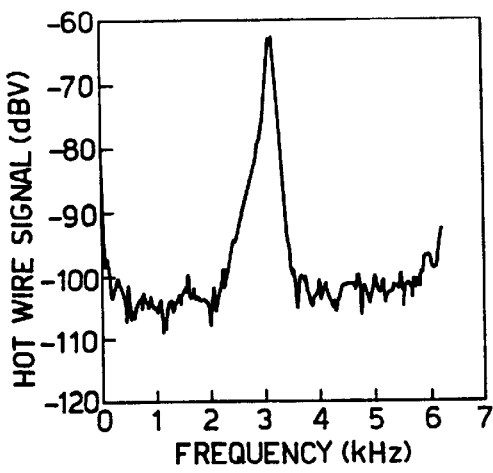
FIG. 15 shows the spectrum of a hot wire anemometer signal (a) with and (b) without heating current applied to the vortex shedding wire in the arrangement of FIG. 14, with vortex shedding frequencies (a) 3.10 kHz, (b) 3.46 kHz.
Figure 15B:
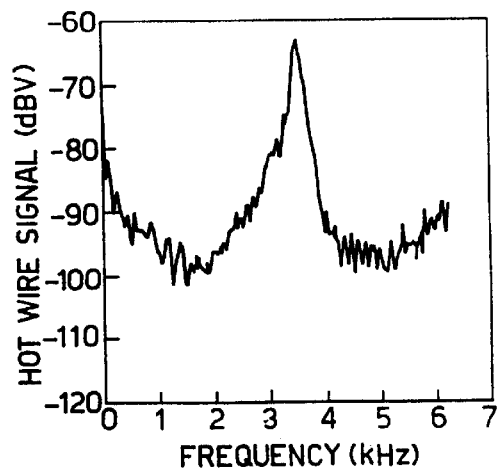

A 40 $\mu$m length sensor 120 was exposed in the wake of the vortex shedding wire 115. The hot-wire probe monitored the vortex shedding frequency. At a fixed tunnel air velocity of 7.28 ms$^{-1}$ (Re=178) the vortex shedding frequency was 3.46 kHz with no heating current applied. When 28 W DC heating power was applied to the shedding wire 115, the vortex shedding frequency decreased to 3.10 kHz. The electrical signal from the photodetector 109 (FIG. 13) monitoring the reflected signal was recorded by an FFT spectrum analyser (not shown) with an effective line width of 8 Hz and the results are shown in FIG. 14. A clear spectral peak appeared at the shedding frequency in FIG. 14(*a*) when the heating power was applied to the shedding wire. There was no signal at 3.46 kHz when the power was removed (FIG. 14(*b*)), returning the shedding wire 115 to ambient temperature, which implies that the fibre optic sensor has no significant cross-sensitivity to fluctuations in air velocity, and is responding to air temperature fluctuations only. For comparison, the spectra of the velocity signals from the hot-wire anemometer are shown in FIG. 15.

Figure 11:
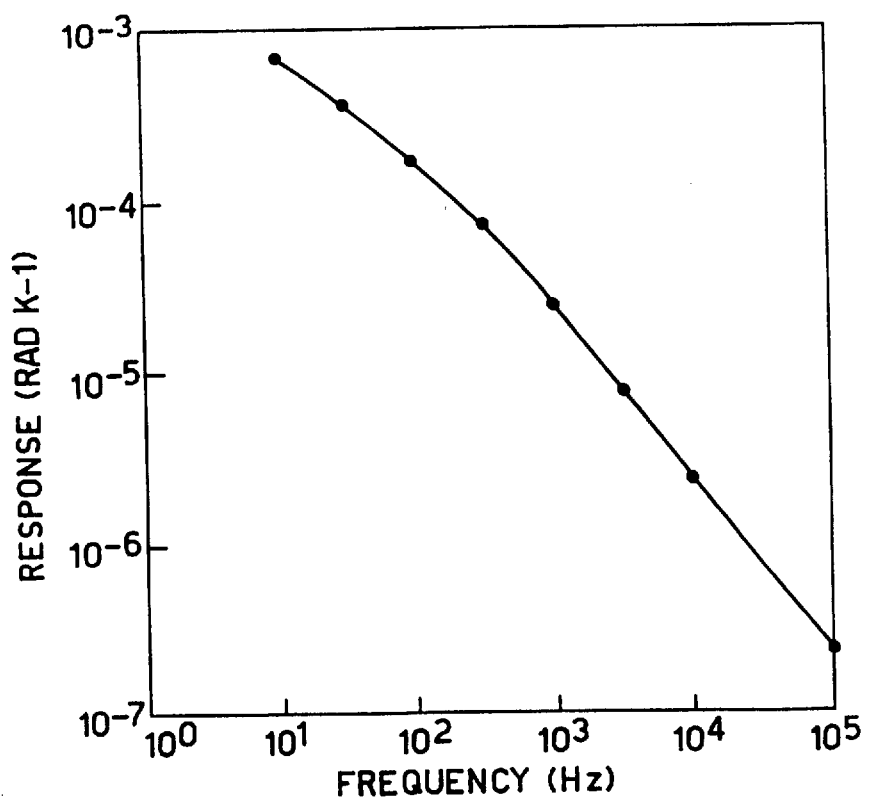
FIG. 11 shows the calculated frequency response of an example of a sensor as shown in FIG. 10 to a unit amplitude oscillation in air temperature.
Figure 12:
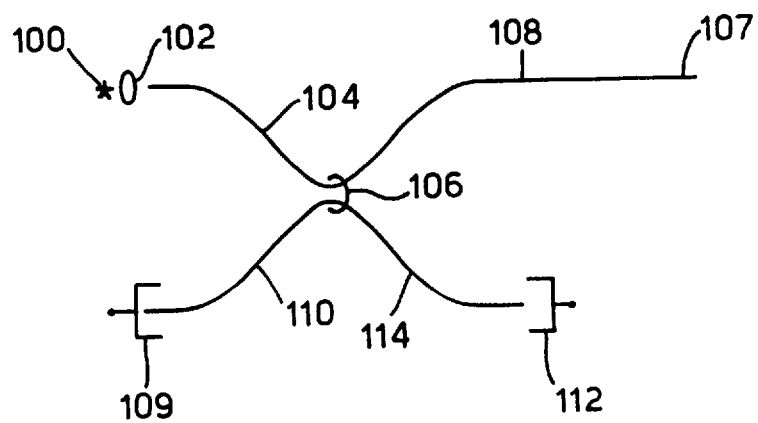
FIG. 12 shows the arrangement of the source and detector optics for the sensor of FIG. 10.

The spectral peak corresponding to the thermal signal detected by the fibre optic sensor varied with the vortex shedding frequency in the expected manner for air flow velocities up to about 7.5 ms$^{-1}$. However, at higher air velocities, up to the tunnel maximum of 12 ms$^{-1}$, any sensor response was masked by increased turbulence. The primary purpose of the vortex shedding experiment was to demonstrate that the short length fibre sensor could respond to temperature fluctuations in an air flow without observable cross-sensitivity to velocity when deployed as a stagnation probe. In the absence of suitable comparison sensor, the amplitude of the temperature fluctuations in the vortex wake was not known accurately, so the temperature calibration of the sensor could not be determined. However a rough estimate of the air temperature fluctuations can be made from the heat convected from the shedding wire in the experimental flow conditions described. An empirical expression relates the heat transfer coefficient to the Reynolds and Prandtl numbers for a cylinder in cross-flow, from which the convective heat loss is estimated to be 160 Wm$^{-1}$. If this power input were uniformly applied to the mass flow in the vortex wake, then the resulting air temperature rise is approximately 11 K. The sensor is thus exploded to temperature oscillation amplitudes of about half this magnitude, or about 5K. The amplitude of the sensor's phase signal was estimated from observation of the turning points of the interferometric output as the sensor was heated from ambient to approximately 500 K by a hot air gun. The peak of the voltage signal in FIG. 15 corresponds to an amplitude of 7.1 $\mu$V or 37 $\mu$radian phase amplitude. The expected response to a unit amplitude air temperature oscillation at 3 kHz, from FIG. 11, is about 8 $\mu$radian, giving an estimated observed temperature amplitude of about 5 K. Thus the observed signal amplitude is in good agreement with that expected from the calculated response at 3 kHz.

The noise floor in FIG. 14 is 7.5 $\mu$rad Hz$^{-\frac{1}{2}}$, the main contribution being from laser intensity noise, which was not compensated in this experiment. Laser frequency noise contributes a phase noise component proportional to the path imbalance of the interferometer. A phase noise of <0.1 $\mu$rad Hz$^{-\frac{1}{2}}$ is expected for a 40 $\mu$m sensor from the known frequency noise characteristics of the laser diode employed. Shot noise, determined by the optical power at the detector, (about 8 $\mu$W in these experiments) will set a practical lower limit of the noise floor at about 1 $\mu$rad Hz$^{-\frac{1}{2}}$. With this value of noise floor, the 40 $\mu$m sensor bandwidth for a 5 K gas temperature amplitude is 2.5 kHz.

The experiment described above demonstrated the sensor's response by narrow bandwidth signal processing using an FFT spectrum analyser. To increase the sensor's bandwidth to the 10 to 60 kHz range, the noise must be minimised and the sensor response maximised. The relative shot noise may be reduced by increasing the optical power at the detector, which may be achieved conveniently through the use of a higher reflectivity coating. The effect of laser phase noise may be reduced by using a shorter sensor, but forming the fibre Fabry-Perot cavity by precision cleaving becomes impractical for lengths as short as 10 $\mu$m.

Alternatively, the sensor may be formed from an optical coating, such as a zinc selenide film of several microns thickness as in the first embodiment. Such a thin film sensor allows the choice of a coating material with a thermo-optic coefficient higher than that of fused silica, thus offsetting the decrease in sensitivity associated with a shorter sensor length.

The desired application to total temperature measurement in turbomachinery tests requires the fibre sensor to be packaged robustly yet exposed with minimum interference to the flow. As in the first embodiment, the fibre can be held rigidly in a glass or metal capillary tubing and the tip exposed at the end of a metal probe stem in a similar way to a thermocouple bead or pressure transducer, so that the aerodynamic characteristic of the probe is identical to a conventional design.

A very short length fibre Fabry-Perot interferometer in accordance with the second sensor embodiment has demonstrated its capability to respond to oscillating air temperatures of approximately 5 K amplitude at a frequency of 3.1 kHz in a vortex wake. The sensor did not show an observable cross-sensitivity to air velocity. The observed response was consistent with that expected from a one-dimensional model of the thermal wave propagating axially in the fibre, using a heat transfer coefficient applicable to a stagnation point.

The invention thus provides apparatus and methods for the measurement of unsteady gas temperatures at relatively high bandwidths, as encountered, for example, in turbomachinery. Improvements and modifications may be incorporated without departing from the scope of the invention.

We claim:

1. Apparatus for the measurement of unsteady gas temperatures comprising:
    (a) a temperature sensing element comprising an optical interferometer optically coupled to a first end of a first, addressing optical fibre, said interferometer comprising an optical film comprising a partially reflective surface defined at said first end of said addressing fibre and a second partially reflective surface spaced from said first partially reflective surface;
    (b) a light source optically coupled to a second end of said addressing fibre;
    (c) an interrogating optical path optically coupled to said addressing fibre by a beam splitter whereby a portion of an optical signal from said sensing element is directed to a first end of said interrogating path and a portion of the input light from said light source is directed to a second end of said interrogating path;
    (d) a first photodetector coupled to said first end of said interrogating path; and
    (e) data acquisition processor connected to said first photodetector, said data acquisition processor being adapted to derive the temperature of said sensing element from said phase signal.

2. The apparatus of claim 1 wherein the thickness of the thin optical film is up to 5 microns.

3. The apparatus of claim 1 wherein said optical film comprises zinc selenide or titanium dioxide.

4. The apparatus of claim 1 further including a second photodetector coupled to the second end of said interrogating path and connected to said data acquisition processor.

5. The apparatus of claim 1 wherein said light source comprises at least one light emitting diode.

6. The apparatus of claim 1 wherein said light source comprises at least one laser light source.

7. The apparatus of claim 6 wherein said at least one laser light source comprises at least one laser diode.

8. The apparatus of claim 1 wherein the light output from said at least one light source is coupled to said second end of said addressing fibre via collimating optics and an optical isolator means.

9. The apparatus of claim 1 wherein said at least one light source is adapted to illuminate said sensing element with light of a plurality of wavelengths selected to give a phase shifts between their corresponding, respective sensing element output signals.

10. The apparatus of claim 9 wherein a single light source is controlled so as to provide said first and second wavelengths.

11. The apparatus of claim 9 wherein said light source comprises a plurality of light sources providing said plurality of wavelengths.

12. The apparatus of claim 11 wherein said plurality of light sources are coupled to said addressing fibre via a directional coupler.

13. The apparatus of claim 11 wherein the light of said plurality of wavelengths is separated spatially at output from the first end of said interrogating path and is coupled to a corresponding plurality of respective photodetectors connected to said data acquisition and processor.

14. The apparatus of claim 11 wherein said plurality of light sources are amplitude modulated at a corresponding plurality of respective frequencies and said first and second wavelengths are temporally demodulated by said data acquisition processor.

15. The apparatus of claim 1 wherein said first end of said addressing fibre, including said sensing element, is mounted in a capillary tube having a pre-formed bend therein whereby said first end of said fibre is turned through substantially 90° with respect to the remainder of the fibre.

16. The apparatus of claim 15 wherein said capillary tube is formed from metal or glass.

17. The apparatus of claim 16 wherein the fibre is secured in said capillary tube by an adhesive and/or by crimping of said tube.

18. The apparatus of any one of claim 17 wherein said capillary tube is mounted in a correspondingly shaped channel formed in a probe body.

19. The apparatus of claim 18, wherein said probe body further includes a second channel within which a thermocouple is mounted adjacent said sensing element.

20. The apparatus of claim 1 wherein said interrogating optical path comprises an optical fibre and said beam splitter comprises a directional coupler.

21. A method of measuring unsteady gas temperatures comprising the steps of:
    (a) locating a temperature probe in the required position, said temperature probe having a sensing element comprising an optical interferometer optically coupled to a first end of a first, addressing optical fibre, said interferometer comprising an optical film comprising a partially reflective surface defined at said first end of said addressing fibre and a second partially reflective surface spaced from said first partially reflective surface;
    (b) illuminating said sensing element with light from a light source optically coupled to a second end of addressing fibre;
    (c) interrogating said sensing element by an interrogating optical path optically coupled to said addressing fibre by a beam splitter whereby a portion of an optical signal from said sensing element is directed to a first end of said interrogating path and a portion of the input light from said light source is directed to a second end of said interrogating path;
    (d) monitoring the optical signal from said sensing element by a first photodetector coupled to said first end of said interrogating path; and
    (e) processing said signal to derive the temperature of said sensing element by a data acquisition processor connected to said first photodetector.

22. The method of claim 21 further including monitoring the light output from said light source by a second photodetector coupled to the second end of said interrogating path and connected to said data acquisition processor.

23. The method of claim 21 wherein said light source is adapted to illuminate said sensing element with light of a plurality of wavelengths selected to give phase shifts between their corresponding, respective sensing element output signals.

24. The method of claim 23 wherein a single light source is controlled so as to provide said plurality of wavelengths.

25. The method of claim 23 wherein said plurality of wavelengths are provided by a corresponding plurality of light sources.

26. The apparatus of claim 25 wherein said plurality of light sources are coupled to said addressing fibre via a directional coupler.

27. The apparatus of claim 25 wherein the light of said plurality of wavelengths is separated spatially at output from the first end of said interrogating path and is coupled to a corresponding plurality of respective photodetectors connected to said data acquisition and processor.

28. The apparatus of claim 25 wherein said plurality of light sources are amplitude modulated at a corresponding plurality of respective frequencies and said plurality of wavelengths are temporally demodulated by said data acquisition and processor.

* * * * *